Jan. 30, 1923.
C. H. RAY.
TRACTOR HARVESTER TRANSMISSION.
FILED APR. 3, 1922.
1,443,548
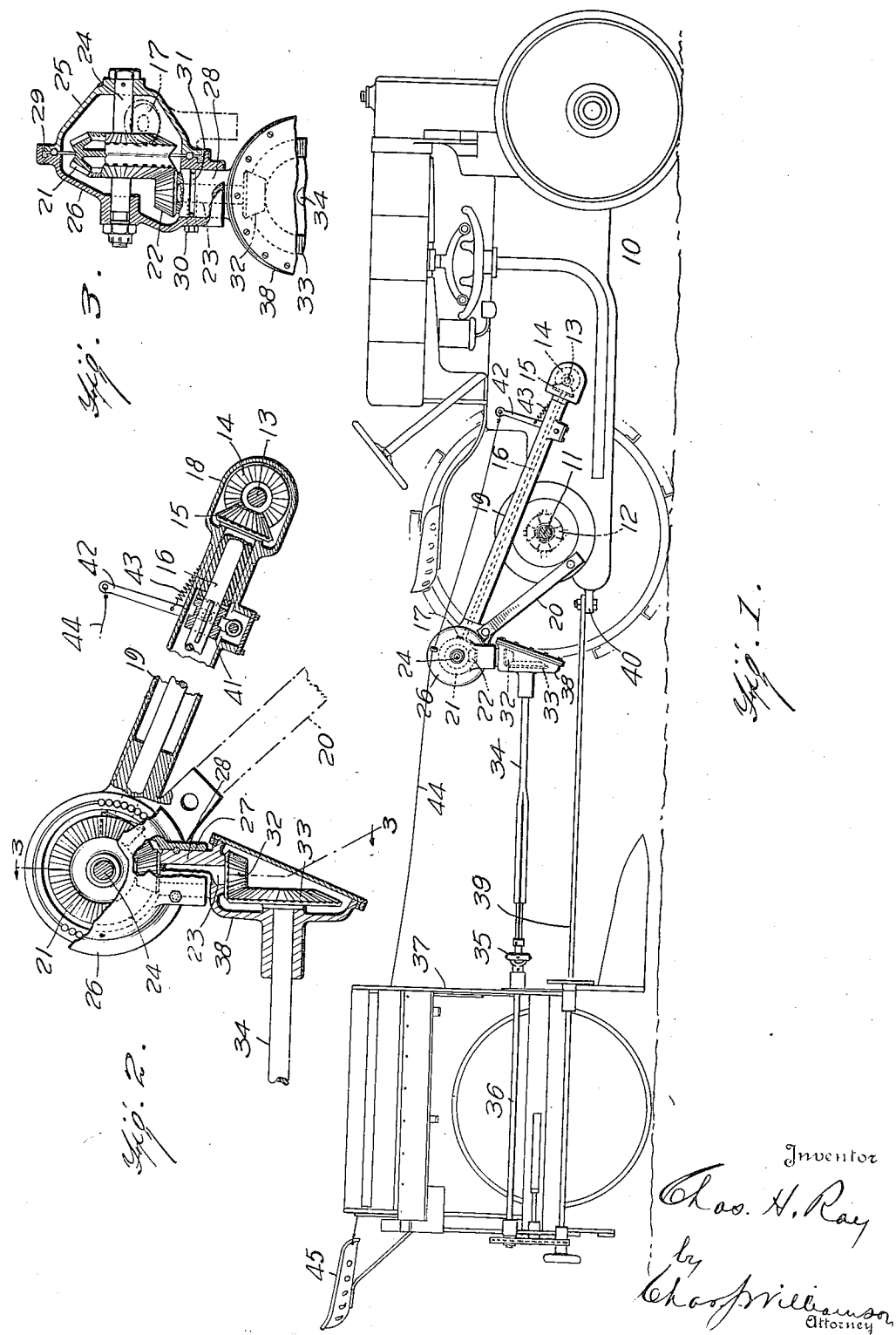

Patented Jan. 30, 1923.

1,443,548

UNITED STATES PATENT OFFICE.

CHARLES H. RAY, OF STUTTGART, ARKANSAS.

TRACTOR-HARVESTER TRANSMISSION.

Application filed April 3, 1922. Serial No. 549,130.

*To all whom it may concern:*

Be it known that I, CHARLES H. RAY, residing at Stuttgart, county of Arkansas, and State of Arkansas, a citizen of the United States, have invented certain new and useful Improvements in Tractor-Harvester Transmissions, of which the following is a specification.

My invention relates to tractor propelled and driven harvesters or like machinery that is moved over the ground, and the object of my invention is to provide a power or transmission connection between the tractor and the harvester which will most advantageously, and with high efficiency, utilize the tractor for operating the harvester mechanism, possess such flexibility as the special conditions of operation require in such a transmission, and which will involve no substantial or inconvenient alteration or modification of tractors as put upon the market. My invention consists in any construction that is described by or included within the terms or scope of the appended claims.

In the accompanying drawing which forms a part of this specification:

Fig. 1 is a view in side elevation of a connected tractor and enough of a self-binding harvester to illustrate an embodiment of my invention;

Fig. 2 is a detail view in vertical section of the flexible portion of the transmission and of its gear connection with the power delivering shaft of the tractor:

Fig. 3 is a section on the line 3—3 of Fig. 2.

The tractor, 10, shown in the drawings is of a well known construction that is driven by an internal combustion or gas engine, and includes rear wheels mounted on a rear axle, 11, that has a differential gear, 12, which by well known gearing, not requiring to be described, is operatively connected with the engine and which forward of the differential gear has a transverse power delivering shaft, 13. By my invention I take power from said transverse shaft, 13, to drive the harvester machinery. On the shaft, 13, is a bevel gear, 14, which meshes with a like gear, 15, on the forward end of a rearwardly and upwardly inclined shaft, 16, that passes above the rear axle to one side of the differential gear, and at its upper and rear end which is carried well to the rear of the tractor, 10, has a bevel gear, 17. The bevel gears at the front end of said rearwardly and upwardly inclined shaft are enclosed in an oil-tight housing, 18, from which rearwardly and upwardly extends a tubular casing, 19, that contains bearings for said shaft, and which by braces or supports, 20, is attached to and supported by the opposite sides of the differential casing. The bevel gear, 17, at the rear end of the upwardly inclined shaft, 16, is in mesh with one of the gears of a twin or double gear, 21, whose other gear is in mesh with a bevel gear, 22, upon the upper end of a vertical shaft, 23. Said double gear is loose upon a short horizontal shaft, 24, which at its opposite ends passes through holes in the opposite halves of a housing, one half, 25, of which has a portion that enters the upper end of the inclined tubular casing, and to which are secured the braces or supports, 20, thus preventing oscillation of said half about the casing axis. The other half, 26, of said housing has a pivotal connection, 27, with the upper end of a tubular casing, 28, which encloses such vertical shaft so that there may be oscillation in a horizontal direction upon the pivotal connection thus afforded with the vertical tubular casing. The housing halves, 25 and 26, have a joint, 29, in a plane at right angles to the axis of the horizontal shaft so that there may be oscillation of the vertical shaft from front to rear, and as there may be oscillation of said shaft on its pivotal connection with the housing half, 26, the essentials of a universal joint that provide for motion on axes at right angles, are provided. A bolt or bolts, 30, passing through holes in the tubular neck of the housing half, 26, and engaging an annular groove, 31, in the periphery of the vertical housing, 28, connects such parts while allowing oscillation as above mentioned. Upon the lower end of the vertical shaft, 23, is a bevel pinion, 32, that meshes with a bevel gear, 33, on the forward end of a rearwardly extending shaft, 34, that is composed of telescopic sections, the rear one of which is connected by a universal joint, 35, with the forward end of a horizontal shaft, 36, at the side of the harvester, 37, and from which by sprocket gear power is delivered to the harvester machinery, all as appears in my application for Patent No. 549,129 filed April 3, 1922. The bevel gears, 32 and 33, are contained in a housing, 38, which has a bearing for the forward end of the shaft, 34, and which is attached to or is integral with the tubular housing, 28, and the vertical shaft, 23.

It will be seen that by the shaft and gearing arrangement which make up my transmission none of the structural characteristics of the tractor require alteration or modification, in any substantial respect, such transmission is carried clear of the tractor parts without in anywise interfering with the operation thereof, or its own operation impaired and the intermediate shaft, 34, is given the position it requires to make a suitable and sufficient connection with the harvester, and my transmission is so jointed that it affords capability of all motion that the exigencies of the application of the tractor to the harvester require, taking into account the more or less trying conditions of operation.

While I prefer the universal joint connection shown and described which comprises the double gear, other forms of such a connection may be employed, such, for example, as those shown in my application for patent hereinbefore mentioned.

As in the case of my before mentioned application, the tractor and harvester are connected by a tongue, 39, the tractor having a draw bar, 40, at the rear of the differential casing for that purpose.

To control the transmission of power to the harvesting machinery at will so as to start or stop the running of the latter, a sliding clutch, 41, is splined to the shaft, 16, with which is connected a lever, 42, having a spring, 43, tending to move the clutch into engagement and from which lever, 42 runs a wire or cord, 44, to a point where it may readily be reached by a man occupying the harvester seat, 45. Means may be provided to engage the cord or wire, 44, to hold the clutch out of engagement and against the pull of the spring, 43.

By the term "harvester", I mean to include a harvesting machine as such and other agricultural machinery presenting similar requirements as to tractive and operating connection with the tractor.

What I claim is:

1. The combination of a tractor having a transversely extending power shaft in advance of the rear axle of the tractor, a shaft geared thereto and extending rearwardly and above the rear axle, a second rearwardly extending shaft adapted for connection with the harvester machinery to operate the latter and situated below such first mentioned shaft, and a universal joint and gear connection between the rear end of the upper shaft and the front end of the lower shaft.

2. The combination of a tractor having a transversely extending power shaft in advance of the rear axle of the tractor, a shaft geared thereto and extending rearwardly and above the rear axle, a second rearwardly extending shaft adapted for connection with the harvester machinery to operate the latter and situated below such first mentioned shaft, a universal joint and gear connection between the rear end of the upper shaft and the front end of the lower shaft, comprising a vertically extending shaft, gearing between the upper end of such shaft and the rear end of the first mentioned shaft, and a jointed housing for such gear connection between said shafts.

3. The combination of a tractor having a transverse power shaft forward of the rear axle of the tractor, a shaft extending upwardly and rearwardly above the axle and geared to said power shaft at its forward end, a jointed housing at the rear end of said rearwardly extending shaft, means supporting one member of said housing from the tractor, a vertically extending shaft, a bearing for said shaft having a swiveled connection with the other member of said housing, a second rearwardly extending shaft adapted for operative connection with the harvester, and gearing between said last named shaft and said vertically extending shaft.

In testimony whereof I hereunto affix my signature.

CHARLES H. RAY.